Aug. 9, 1927.  
J. A. GABRIEL  
1,638,152  
REGULATING VALVE FOR LIQUIDS AND GASES  
Filed Aug. 6, 1921
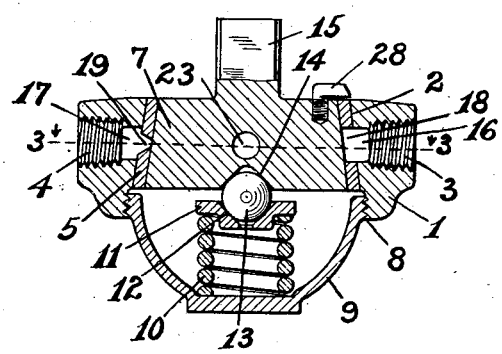
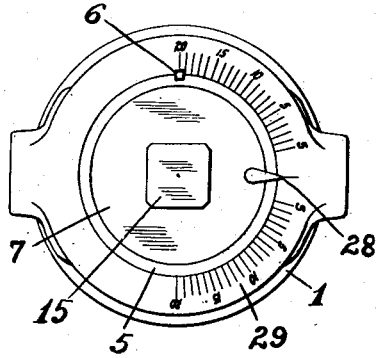
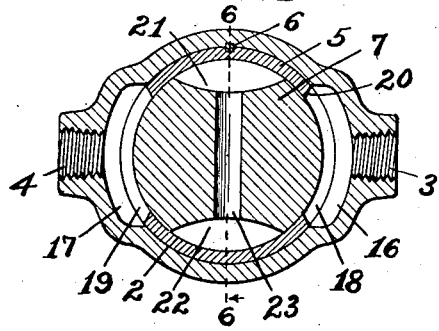
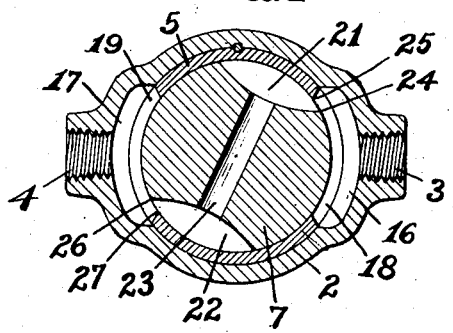
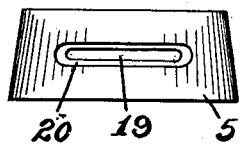
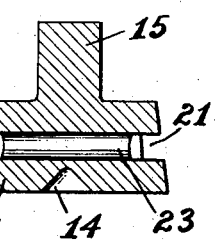
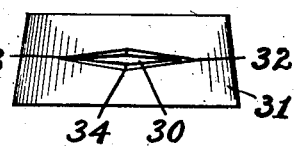
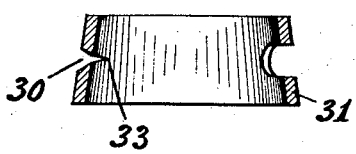
Inventor  
J. A. Gabriel  
By  
his Attorney Patented Aug. 9, 1927.

1,638,152

UNITED STATES PATENT OFFICE.

JOSEPH A. GABRIEL, OF CLEVELAND, OHIO.

REGULATING VALVE FOR LIQUIDS AND GASES.

Application filed August 6, 1921. Serial No. 490,373.

This invention relates to regulating valves for liquids and gases, and more particularly to the design or form of the openings of valves for liquid or gaseous fuel burners.

The principal object of the invention is to provide a valve by which the flow of liquids or gases may be increased or decreased very gradually.

Another object of the invention is to provide a valve by which the flow of liquids or gases may be increased gradually to a certain point and then further increased in a diminishing proportion. The purpose of this is to obtain a gradual increase in the flow of liquids or gases at first and then a still further increase which gradually diminishes so as to give a very fine adjustment at first and then again at the last.

In order that the invention may be clearly understood, the same will be hereinafter fully described as illustrated in the accompanying drawings, and the novel features thereof will be distinctly pointed out in the appended claims.

In the drawings similar characters of reference are used to designate corresponding parts.

Figure 1 is a sectional elevation of a valve having openings in accordance with my invention, Fig. 2 is a plan view of the valve, Fig. 3 is a cross-sectional view taken on line 3—3 of Fig. 1, Fig. 4 is a similar view, the plug being in its slightly open position, Fig. 5 is a side view of the sleeve looking toward the outlet opening thereof, Fig. 6 is a sectional elevation of the plug taken on line 6—6 of Fig. 3, Fig. 7 is a similar view to Fig. 5 illustrating a modification of the outlet opening thru the sleeve, and Fig. 8 is a sectional elevation of Fig. 7.

Referring to the drawings 1 represents a body, which is provided with an inwardly tapering bore 2, and leading thereto and therefrom are inlet and outlet openings 3 and 4 arranged opposite each other. A sleeve 5 is fixed in the bore 2 by means of a key 6, and a plug 7 is rotatably mounted in said sleeve. Threaded into the lower part of the body 1 at 8 is a semi-spherical cap 9, which encloses a coil spring 10 and a plate 11 resiliently supported thereby, having a central conical depression 12 for receiving a ball 13. Said ball is forced into a conical impression 14 provided in the center bottom of the plug 7, and this holds said plug in central position in the sleeve 5 under suitable pressure for preventing leakage yet permitting easy turning of the plug by means of a wrench applied to a square boss 15 projecting from the top thereof.

This invention resides more particularly in the means of communication between the inlet opening 3 and the outlet opening 4, whereby the flow of liquids or gases passing thru the valve may be regulated by very fine adjustments and said means will now be described. In the body 1, opposite the inlet opening 3 and the outlet opening 4, are transversely extending recesses 16 and 17 respectively, and these establish communication with transverse slots 18 and 19 thru the sides of the sleeve 5. The edges of the slots 18 and 19 taper from the outside of the sleeve to the inside thereof as shown at 20. Opposite sides of the plug 7 are provided with transverse grooves 21 and 22 cut thereinto on the arc of a circle and of a length which corresponds to the inner sides of the slots 18 and 19 and these are connected by a conduit 23 extending from one to the other thru said plug. When the plug 7 is in the position, as in Figs. 1 and 3, the valve is closed, and when the plug is turned clockwise, as illustrated in Fig. 4, the forward edge 24 of the transverse groove 21 overlaps the rear edge 25 of the transverse slot 18 of the sleeve 5, and at the same time, the forward edge 26 of the other groove 22 of the plug overlaps the rear edge 27 of the slot 19 of the sleeve, thereby gradually increasing the communication from the inlet opening 3 to the outlet opening 4 of the valve body, until the grooves 21 and 22 are opposite the transverse slots 18 and 19. A pointer 28 carried by the plug 7 serves to indicate by means of suitable marks at 29 on the valve body to what extent the plug is turned and the corresponding degrees of opening. By turning the plug in the reverse direction, the communication between the inlet opening 3 and outlet opening 4 will be gradually decreased as will be understood.

Instead of both of the slots 18 and 19 in the sleeve 5 having straight upper and lower sides as shown in Fig. 5, the outlet slot as 19 may be made in the form of a transversely extending diamond as at 30 thru the walls of the sleeve 31. When the outlet slot 30 is diamond shaped, and therefore tapering from each of its ends as 32 and 33 to the widest central point 34, and the plug 7 is rotated clockwise, the forward edge 26 of the groove 22 overlaps the narrow pointed end 32 of said outlet slot, and gradually increases the communication from the inlet opening 3 to the outlet opening 4 as before described, but more gradually until said forward edge reaches said widest central point of said slot. Then the communication further increases, but this further increase gradually diminishes until the forward edge 26 of the groove 22 passes the other narrow pointed end 33 of the outlet slot 30. This gives a very fine adjustment at first and also at the last as the valve is opened, and the same but reverse results are obtained when the valve is being closed.

It is thought that the advantages of a valve constructed as described and having inlet and outlet openings of said particular design will be appreciated without further explanation, and it is to be understood that slight changes in the detail of construction may be made for obtaining the desired results and still be within the scope of the claims.

Having fully described my invention what I claim is:

1. In a regulating valve, the combination of a body, the body having inlet and outlet openings, the body being provided with transversely extending recesses leading from said openings, a sleeve fixed in the body, the sleeve being provided with transversely extending slots opposite said recesses, the slots having edges tapering from the outside to the inside of the sleeve, a plug rotatably mounted in the sleeve, the plug having grooves in the sides thereof and a conduit connecting the grooves, and said grooves being adapted to establish communication between said slots, substantially as described.

2. In a regulating valve, the combination of a body, the body having inlet and outlet openings, the body being provided with a transversely extending recess leading from one of said openings, the recess having opposite sides tapering to a point, a plug rotatably mounted in the body, the plug having grooves in the sides thereof and a conduit connecting the grooves, and the grooves being adapted to establish communication between said recess and the other of said openings, substantially as described.

3. In a regulating valve, the combination of a body, the body having inlet and outlet openings, the body being provided with a transversely extending recess leading from one of said openings, a sleeve fixed in the body, the sleeve being provided with a transversely extending slot opposite said recess, the slot having opposite sides tapering to a point, a plug rotatably mounted in the sleeve, the plug having grooves in the sides thereof and a conduit connecting the grooves, and the grooves being adapted to establish communication between said recess and the other of said openings, substantially as described.

4. In a regulating valve, the combination of a body, the body having inlet and outlet openings, the body being provided with a transversely extending recess leading from one of said openings, the recess having opposite sides tapering to a point from the center thereof, a plug rotatably mounted in the body, the plug having grooves in the sides thereof and a conduit connecting the grooves, and the grooves being adapted to establish communication between said recess and the other of said openings, substantially as described.

5. In a regulating valve, the combination of a body, the body having inlet and outlet openings, the body being provided with transversely extending recesses leading from said openings, a sleeve fixed in the body, the sleeve being provided with transversely extending slots opposite said recesses, the slot of the sleeve opposite the outlet recess of the body being diamond shaped, a plug rotatably mounted in the sleeve, the plug having grooves in the sides thereof and a conduit connecting the grooves, and said grooves being adapted to establish communication between said slots, substantially as described.

In testimony whereof I affix my signature.

JOSEPH A. GABRIEL.